FIG. 1

INVENTORS
BRUCE W. EWING,
EDWIN E. MALLORY &
BY JOHN P. SAPP

Oberlin & Limbach
ATTORNEYS

FIG.2

Aug. 28, 1962  B. W. EWING ET AL  3,051,220
STITCHER ASSEMBLY IN A TIRE BUILDING MACHINE
Filed April 29, 1957  10 Sheets-Sheet 8

INVENTORS
BRUCE W. EWING,
EDWIN E. MALLORY &
BY JOHN P. SAPP
Oberlin & Limbach
ATTORNEYS

United States Patent Office 3,051,220
Patented Aug. 28, 1962

3,051,220
STITCHER ASSEMBLY IN A TIRE BUILDING MACHINE
Bruce W. Ewing, Barberton, Edwin E. Mallory, Cuyahoga Falls, and John P. Sapp, Kent, Ohio, assignors to National Rubber Machinery Company, Akron, Ohio, a corporation of Ohio
Filed Apr. 29, 1957, Ser. No. 655,754
7 Claims. (Cl. 156—398)

The present invention relates as indicated to a tire building machine and components thereof and more particularly to a tire building machine of the type which utilizes a radially collapsible rotary tire building drum around which ply and tread stock is wrapped and turned about beads at the drum ends to form a tire carcass. The carcass, after completion on such machine, is removed from the collapsed drum and transported to a tire vulcanizer that is operative in well known manner to deform the carcass to tire shape and to vulcanize the thus-shaped carcass.

The present machine, in the illustrative embodiment herein, is especially adapted for use in the making of a so-called "shoulder-built" heavy duty truck and bus tire carcass that is characterized by the provision of dual beads at each end of the carcass located radially inward a substantial distance from the main cylinder body or tread portion so as to reduce the relative amount of deformation of said tread portion with respect to the beads during the shaping and vulcanizing operations as compared with the deformation of a passenger car tire carcass in which the beads and tread are of substantially the same diameter.

One prevalent practice in the art of making shoulder-built tire carcasses on a tire building drum is to wrap the ply stock around the drum with the edge portions overhanging the drum shoulders whereby, when multiple plies are thus applied around the drum, the overhanging edge portions are not firmly stitched together. A subsequent operation involves the turning in of the overhanging plies against the drum shoulders, followed by placement of a bead against the turn-in stock, whereafter rings are pulled out from within the drum to press the stock against the I.D. of the respective beads.

The plies are then flared outwardly around the beads and stitched to the inturned portions of said plies. The foregoing operations are then repeated for wrapping plies around another set of beads. Finally, after these and other operations are performed the tread and side wall stock is applied and stitched onto the last applied ply. The carcass thus built is axially removed from the drum after collapsing the latter, and in the case of a heavy duty tire carcass for a truck or bus, such removal of the carcass involves a great deal of fatiguing manual effort on the part of the machine operator.

It is a principal object of this invention to provide a machine for building tires which has axially reciprocable ply rings adapted for movement against the drum shoulders to constitute extensions of the drum so that multiple plies may be stitched together, if desired, prior to being turned in against the drum shoulders.

It is another object of this invention to provide a tire building machine which has a novel form of bead storage and placement mechanism.

It is another object of this invention to provide a tire building machine which includes a novel inflatable bag arrangement to initiate uniform folding out of inturned plies around the beads placed thereagainst, said bags, when in deflated condition, having adequate clearance with the beads to facilitate movement from a position within the drum to a position within the respective beads.

It is another object of this invention to provide a tire building machine which has associated therewith a radically new type of stitching assembly, with reference, not only to the mechanism itself and its mounting, but, also to the unique movements that are imparted to the stitching discs during the performance of the ply turn-in, ply turn-out, tread stitching, and other operations as fully explained hereinafter.

It is another object of this invention to provide a tire building machine which essentially comprises three units, namely, (1) an inboard unit that carries the drum and drive motor therefor, a ply ring and bead storage-placement assembly and its drive motor, and an air bag and its actuator; (2) an intermediate unit which carries the stitcher mechanism; and (3) an outboard unit which, in addition to mounting the drive means for the other ply ring and bead storage-placement assembly and for the other air bag and its actuator, is provided with a drum pilot shaft and a brake effective, when actuated, to cause collapsing of the drum, said outboard unit being reciprocably mounted on its base for disengagement of the drum pilot shaft from the drum and for axially withdrawing the tire carcass from the collapsed drum. In addition, such movement of the outboard unit provides access for loading of beads onto the bead storage-placement assembly of the outboard unit, and for loading of beads over the collapsed drum onto the bead storage-placement assembly of the inboard unit.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail a certain illustrative embodiment of the invention, this being indicative, however, of but one of the various ways in which the principle of the invention may be employed.

In said annexed drawings.

In order to facilitate the understanding of the construction and operation of this machine the same is herein described under the following main headings:

I. Machine As a Whole
II. Drum Mounting and Drive
III. Ply Rings and Bead Storage—Placement Assemblies
IV. Air Bags and Carcass Holder
V. Stitcher Assembly
VI. Automatic Control
VII. Operation

(I) MACHINE AS A WHOLE
(FIGS. 1–15, and 26)

This machine as best shown in FIGS. 1 to 15 and 26 (especially FIGS. 1, 2, 5 and 26) comprises three successively arranged bases 1, 2, and 3 on which an inboard assembly 4, a stitcher assembly 5, and an outboard assembly 6 are respectively mounted.

Figure 1:
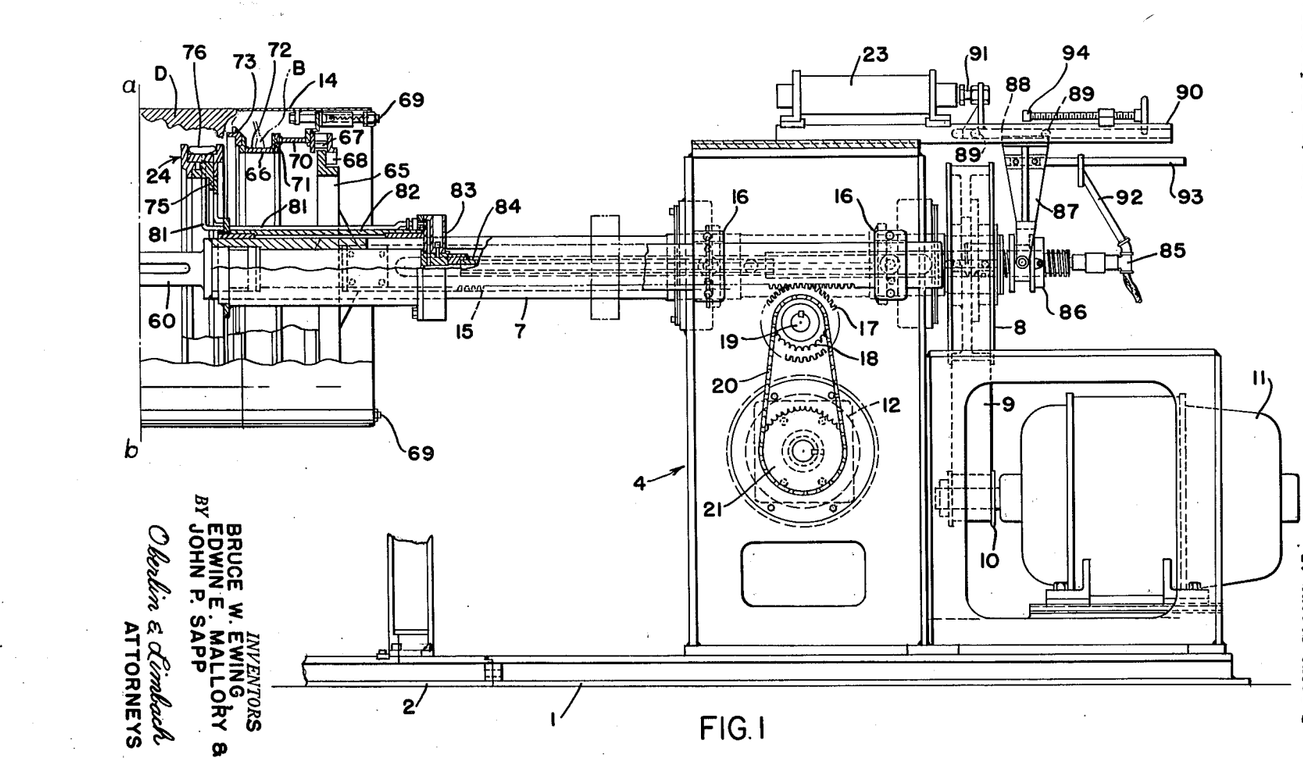
FIG. 1 is a front elevation view, partly in cross-section, of the right-hand or inboard end of the present tire building machine.

(a) *The inboard assembly.*—The inboard assembly 4 has journalled therein the horizontally extending drum drive shaft 7 which has keyed thereon the toothed pulley 8 over which is trained a toothed belt 9, said belt additionally being trained over the toothed drive pulley 10 mounted on the drive shaft of the drum drive motor 11. Said inboard assembly also has mounted therein a drive motor 12 (preferably a fluid motor) for axially reciprocating a ply ring 14, which is carried at the ends of a pair of rack bars 15, the latter being slide-guided in slideways 16 formed on the front and rear sides of said inboard assembly 4. Said rack bars 15 are driven by gears 17 in mesh therewith, said gears 17 and a sprocket wheel 18 being mounted on a transverse shaft 19, said sprocket wheel 18 having a chain 20 thereover and driven by a sprocket wheel 21 mounted on the drive shaft of said ply ring drive motor 12.

Said inboard assembly also mounts a pneumatic cylinder 23 for reciprocating the air bag assembly 24 that is mounted on the drum drive shaft 7 for movement from a retracted position inside the collapsible drum D to a position disposed inside a tire bead which is adapted to be placed against the shoulder of said drum D.

The detailed operation and structure of these components of the inboard assembly 4 will be described in detail under the appropriate headings.

(b) *The stitcher assembly.*—The stitcher assembly 5 on base 2 will be described in detail under heading "V. Stitcher Assembly," so for the present, it suffices merely to state that it comprises a pair of stitcher carriages 30 mounted for (1) radial traverse toward and away from the periphery of said drum D; (2) axial traverse parallel to the axis of drum D; and (3), (4) rotary motions about parallel axes that are normal to the direction of the radial traverse.

By reason of such movements, the ply stitcher discs 31 on the respective carriages 30 may perform ply turn-in and turn-out operations upon ply stock adapted to be wrapped around drum D, and the tread stitcher discs 32 also on the respective carriages may perform tread and side wall stitching operations on stock similarly wrapped around drum D.

Figure 2:
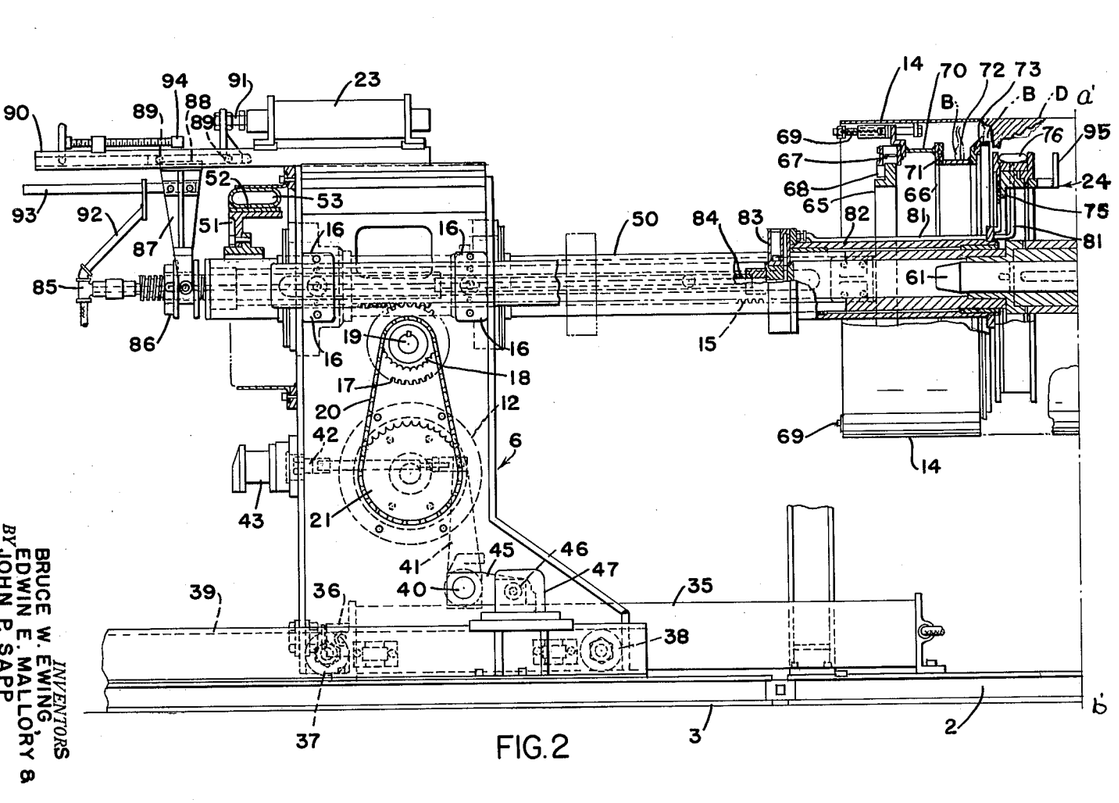
FIG. 2 is a similar front elevation view, partly in cross-section, of the left-hand or outboard end of the machine.

(c) *The outboard assembly.*—The outboard assembly 6 is reciprocably mounted on base 3, a pneumatic cylinder 35 being mounted on the base 3 for this purpose, its piston rod 36 being connected to said outboard assembly 6.

Said outboard assembly 6 is provided with rollers 37—38 which are engaged in tracks 39 formed in the base 3. Said outboard assembly 6 is locked in its forward operating position through a bellcrank assembly comprising a shaft 40 extending transversely through assembly 6, an arm 41 on said shaft linked to the piston rod 42 of a lock cylinder 43 and arms 45 at the ends of said shaft, each carrying a roller 46 for engaging the overlying surface of a hooklike member 47 mounted on each side of said base 3. Counter clockwise rotation of said bellcrank assembly as viewed in FIG. 2 causes engagement of rollers 46 with said hooklike members 47 thereby pressing the outboard assembly 6 downward against and locking same on the base 3.

The outboard assembly 6 is provided with a horizontally extending shaft 50 which has disengageable connection with the drum D, said shaft 50 being journalled in said outboard assembly 6 and having, at its left end, a brake drum 51 with which arcuate brake shoes 52 of an air bag 53 are adapted to be frictionally engaged as the air bag is inflated when it is desired to arrest the rotation of said shaft 50 to cause collapsing of the drum.

Said outboard assembly 6, like the inboard assembly 4, also carries a ply ring drive motor 12 which, through sprocket wheels 18 and 21 and chain 20 is adapted to rotate transverse shaft 19 which has gears 17 mounted thereon in mesh with a pair of rack bars 15 disposed on opposite sides of said outboard assembly. Again, as before mentioned, the ends of said rack bars 15 mount the ply ring 14. Again, like the inboard assembly, said outboard assembly 6 has mounted thereon a pneumatic cylinder 23 for actuating the other air bag assembly 24 between operating and retracted positions within a tire bead and within the outboard end of said drum D.

As aforesaid, the various components of the machine will be described in detail under the appropriate main headings, especially the stitcher assembly 5 which is mounted on the intermediate base 2 and which for sake of clarity has been omitted in FIGS. 1 and 2.

Figure 3:
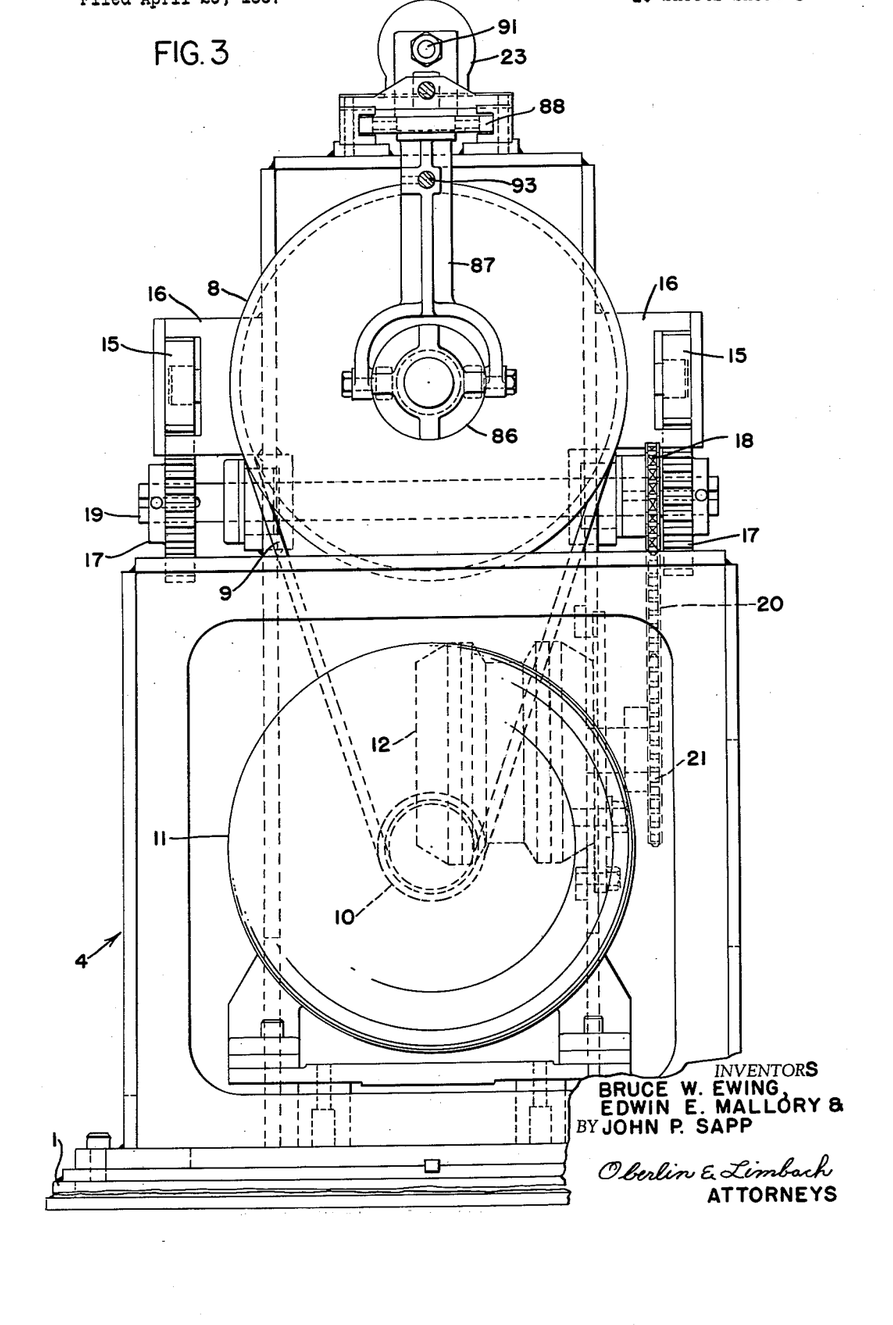
FIG. 3 and FIG. 4 are end elevation views as viewed from right-hand and left-hand ends of FIGS. 1 and 2 respectively.
Figure 4:
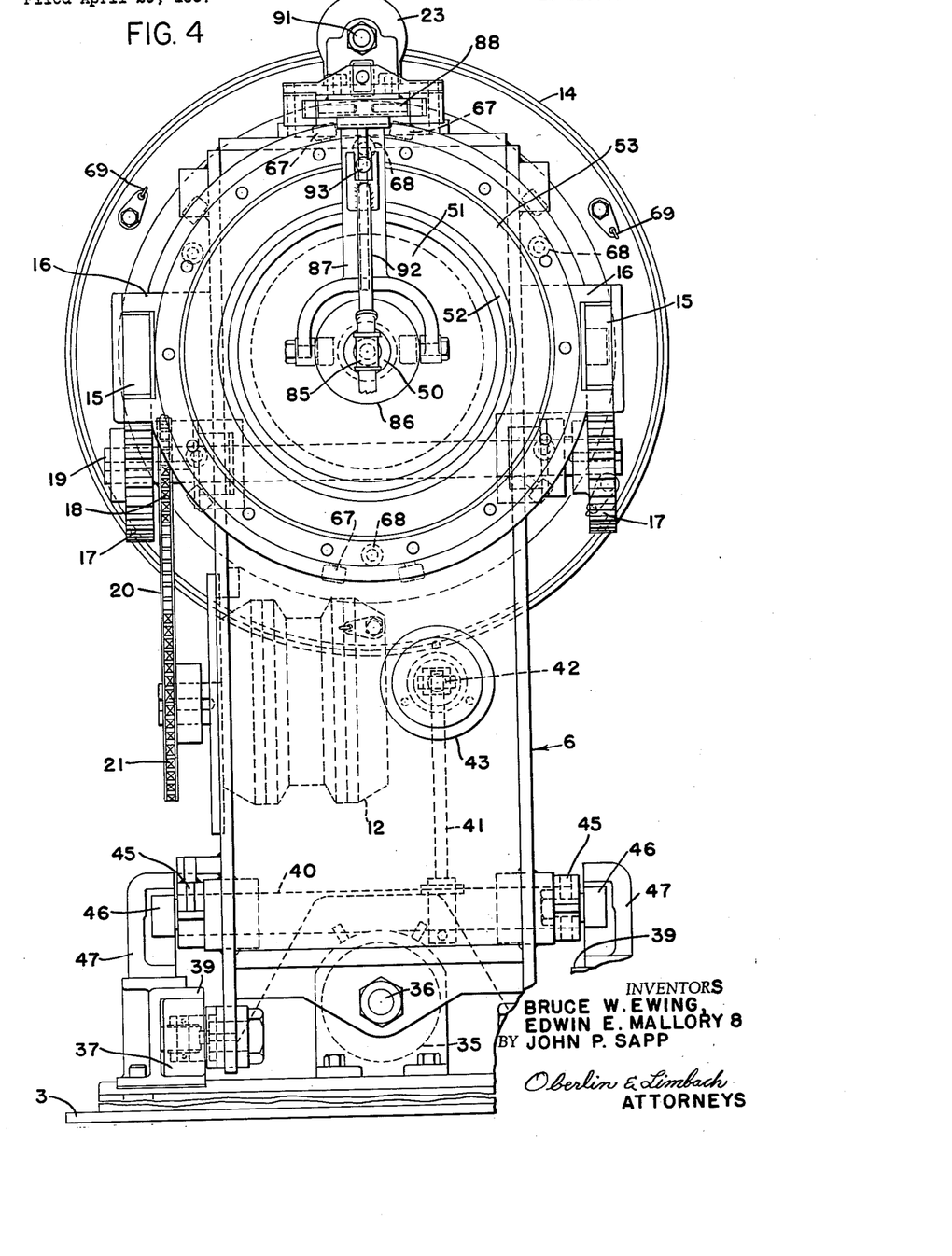
Figures 9A, 26:
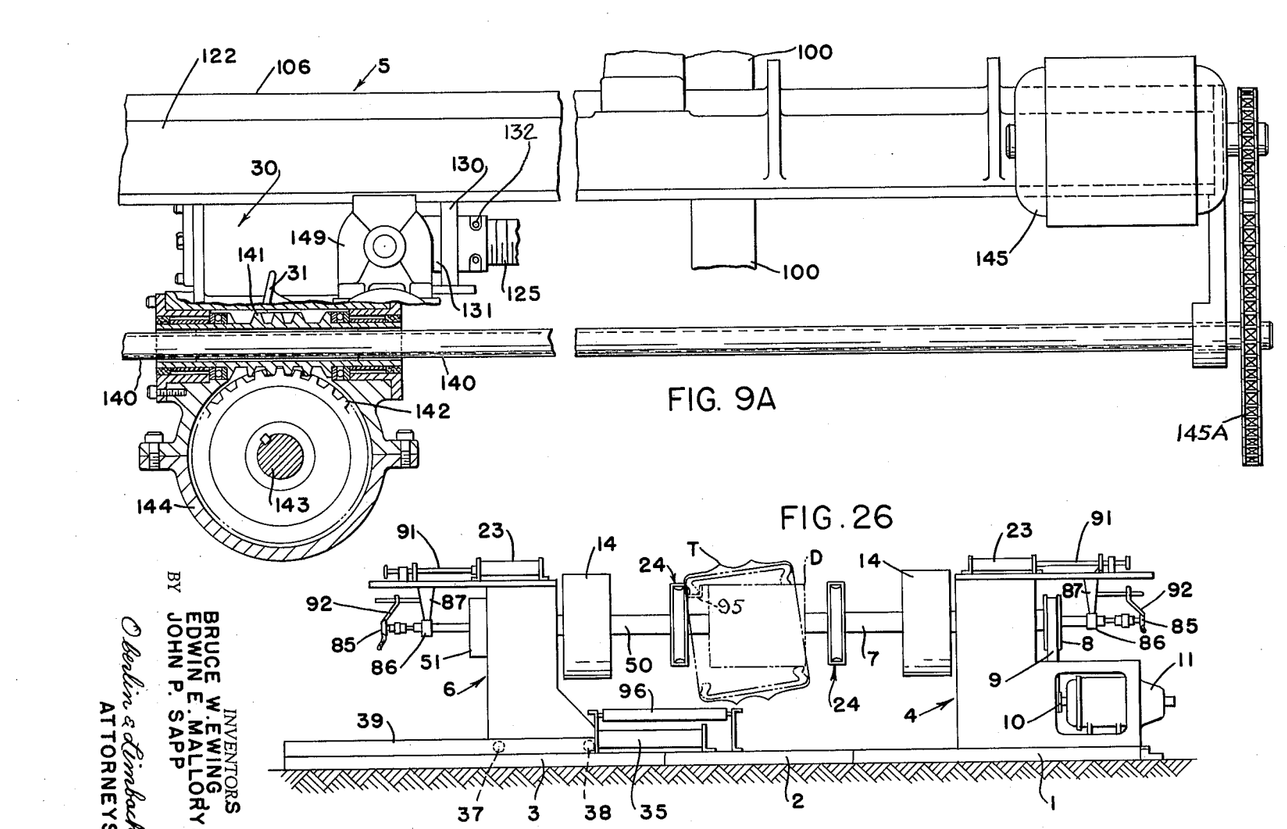
FIGS. 16 to 26 are schematic diagrams showing the successive movements of the components of the present tire building machine in the building of a 10-ply, dual bead tire of size 10.00x20, for example.

II. DRUM MOUNTING AND DRIVE
(FIGS. 1, 3 and 26)

The drum D is not illustrated in detail herein because it may be of conventional design including relatively rotatable parts which are effective when relatively rotated in one direction to cause arcuate segments comprising the same to move radially outwardly to define a drum having a cylindrical outer surface of the desired diameter, and which parts, when relatively rotated in the opposite direction, are effective to collapse the drum by moving said arcuate segments radially inwardly. In any case, irrespective of the particular structure of the collapsible drum D, the drum drive shaft 7 aforesaid has a pilot 60 at its end which is keyed to one of such relatively rotatable drum parts whereby said drum D is supported by the drive shaft 7 and rotated thereby.

The other shaft 50 on which the brake drum 51 is mounted fits over a pilot 61 on the other part of said drum D whereby, when the outboard assembly 6 is in its forward or operating position, said drum D is supported by said shaft 50 for rotation to perform the various tire building operations hereinafter described.

As aforesaid, when said brake 51—52 is applied, the arresting of the rotation of shaft 50 and pilot 61 while the drum part associated with shaft 7 coasts to a stop, effects, in known manner, collapsing of the drum D.

III. PLY RINGS
(FIGS. 1–4, 15, and 26)

The ply rings 14, or more properly, the assemblies including the ply rings and the bead placement and storage units are, as aforesaid, mounted at the ends of the respective pairs of rack bars 15, and each comprises a support ring 65 which is bolted or otherwise secured to the ends of said rack bars 15 and to which the bead placement and storage ring 66 and said ply ring 14 are rotatably connected as by means of the radially and axially disposed rollers 67 and 68 for rotation of said ply rings 14 and bead placement and storage rings 66 in unison with drum D. Each ply ring 14 has a lost motion spring connection 69 with its mount 70 so as to axially yieldably press against the end of the drum D irrespective of whether the associated bead placement ring is positioning the first or second tire bead against the drum shoulder.

Figure 15:
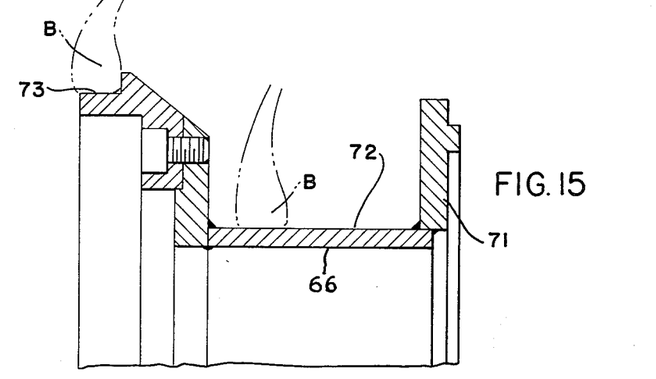
FIG. 15 is an enlarged radial cross-section view of the inboard bead storage and placement ring.

Each bead placement and storage ring 66 is provided with a flange 71 for connection to mount 70 and with a peripheral well 72 and step 73, the well 72 serving to facilitate buttoning of a bead B over step 73 (in a manner comparable to that involved in the mounting of a tire on a drop-center wheel), and the step 73 serving to carry a bead B for coaxial pressing against the adjacent end of the drum D.

As is evident from FIGS. 1 and 2, the ply rings 14 and the bead placement and storage rings 66 associated with the inboard and outboard assemblies 4 and 6 respectively, are moved axially to operating position and axially withdrawn therefrom by rotating the respective gears 17 on the shafts 19 in opposite directions.

IV. AIR BAGS AND CARCASS HOLDER

(FIGS. 1, 2, 13, 14, and 26)

Figure 13:
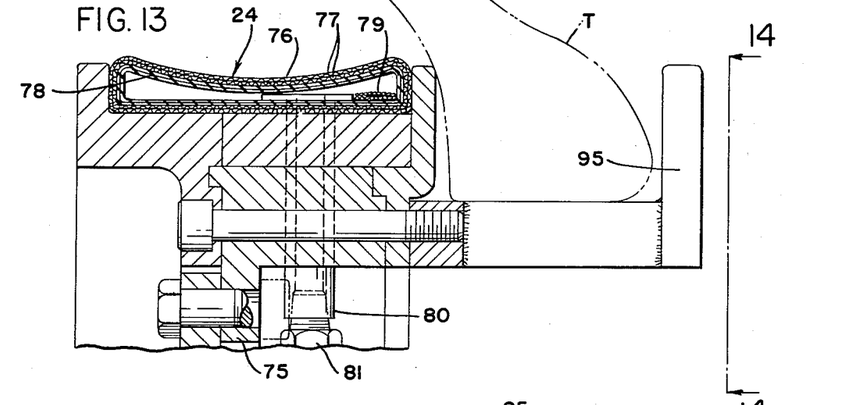
FIG. 13 is an enlarged radial cross-section view showing the outboard air bag and its tire support hook, the inboard air bag being the same except reversed and not provided with such hook.
Figure 14:
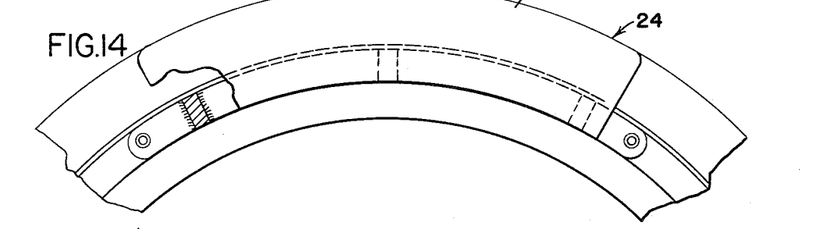
FIG. 14 is a partial elevation view from the right-hand side of FIG. 13 showing the tire removing hook.

Each air bag assembly 24 as shown in FIGS. 1 and 2, and also in FIG. 13, comprises a spoked support ring 75 formed with a peripheral groove or well in which is disposed an annular air bag 76, said air bag 76 preferably comprising two plies of cord fabric 77 (for example, #36 gauge rayon cord fabric) in which the cords extend generally axially, a liner 78 of rubber (for example #40 gauge), and a reinforcing liner 79 as of two plies of rayon cord fabric in which the cords extend circumferentially to prevent radial expansion of that portion of the air bag.

Each air bag 76 is provided with a nipple 80 to which an air supply and exhaust conduit 81 is connected.

The air bag support ring 75 has its hub sleeve 82 axially slidably keyed on the respective drum shaft 7 and 50 for movement between the solid line and dotted line positions. Each sleeve 82 has a radial arm 83 that accommodates conduit 81 and that axially slidably extends through a slot formed in the respective drum shaft 7 and 50. The inner end of said arm 83 is secured to a hollow shaft 84 that extends through the respective shaft 7 and 50 and that constitutes an extension of conduit 81. The outer end of each shaft 84 has a pipe fitting 85 thereon for connection with a solenoid operated air control valve (not shown) or the like operative to supply air to the bag 76 for inflating the same and for exhausting such air from the bag to permit deflation.

The outer end of each shaft 84 has a yoke nut 86 screwed thereon with which yoke bracket 87 is engaged, the latter, in turn being secured to a carriage 88 with rollers 89 engaging slideway 90. The carriage 88 is secured to piston rod 91 of the air bag actuating cylinder 23 whereby the air bag assembly 24 is axially reciprocated responsive to movement of the piston in said cylinder 23. Each shaft 84 is held against rotation by an arm 92 thereon slidably fitted on rod 93 extending axially from yoke bracket 87 so that as yoke nut 86 is turned said shaft 84 is moved axially to position air bag assembly 24 inside drum D. An intermediate position of said assembly 24 inside the drum shoulder is determined by an adjustable screw stop block 94, which block is arranged, when turned 90°, to clear carriage 88 to permit full withdrawal of the air bag assembly 24 beyond the respective end of said drum D for a purpose which will appear.

Both air bag assemblies 24 are the same except that the one at the outboard (left) end of the drum D is provided with a hook 95 (see FIGS. 13 and 14) by which the tire carcass T is adapted to be dragged axially from the drum D when the latter is collapsed. Thus, as the outboard assembly 6 (and outboard bag assembly 24) is withdrawn toward the left by the actuation of the cylinder 35, the tire carcass T will be axially drawn off the collapsed drum D to a position above the transverse gravity conveyor 96 (FIG. 26) whereupon raising of the left end of the roller section of said conveyor will lift the tire bead out of engagement with hook 95. The movement of assemblies 6 and 24 continues whereby the carcass T moves away from the machine along said conveyor 96.

V. STITCHER ASSEMBLY

(FIGS. 5 to 12)

As aforesaid (under heading I(b)), the stitcher assembly 5 on base 2 essentially comprises a pair of stitcher carriages 30 each mounting a ply stitcher disc 31 and a tread stitcher disc 32, said discs 31 and 32 partaking of several movements to perform their operations on ply and tread stock and beads applied on the drum D. These movements are, as previously mentioned, (1) radial traverse, (2) axial traverse, and (3), (4) rotary motions about parallel axes. The structure for accomplishing these movements will now be described in detail.

(1) *Radial traverse.*—By reference to FIGS. 5, 7, 8, 9, and 9A it can be seen that the base 2 has secured thereto adjacent the ends and toward the rear a pair of allochiral triangular supports 100 providing downwardly and forwardly inclined tracks 101 and guides 102 in which and with which the perpendicularly related rollers 103 and 104 of the brackets 105 of a carriage mount 106 are respectively engaged. Thus, when the carriage mount 106 is reciprocated along said tracks 101 and guides 102, the ply and tread stitchers 31 and 32 will be moved radially toward and away from the axis of the drum D.

Extending across and secured to the upper ends of said supports 100 is a bar 107 provided with bearings 108 for screw shafts 109 disposed parallel to the respective tracks 101 and engaged with nuts 110 of the respective brackets 105. Each screw shaft 109 has a sprocket wheel 111 thereon with which a chain 112 is engaged, said chain being engaged with a sprocket wheel 113 on the drive shaft of a reversible electric motor 114. Said motor 114 is mounted on a triangular base 115 that is secured on base 2 intermediate the supports 100.

As now evident, when screw shafts 109 are rotated in opposite directions by motor 114, the carriage mount 106 will be reciprocated along the tracks 101 and guides 102 to move the carriages 30 toward and away from the drum D.

(2) *Axial traverse.*—As best shown in FIGS. 5, 6, 9, and 9A each stitcher carriage 30 is provided with top and bottom rollers 120 and with rear rollers 121 engaged in horizontally extending top and bottom tracks 122 and with a horizontally extending rear track 123 in carriage mount 106. Movement of the carriages 30 toward and away from each other along said tracks 122 and 123 is effected by oppositely threaded coaxial screws 124 and 125 that are in threaded engagement with the respective carriages 30 and that are keyed together at their meeting ends. Screw 124 has a sprocket wheel 126 keyed thereon which is driven by a chain 127, said chain, in turn, being driven by the sprocket wheel 128 keyed to the drive shaft of a reversible electric drive motor 129.

The coupling 130 which joins the ends of screws 124 and 125 together comprises coupling halves 131 and 132 keyed and axially fixedly mounted on the ends of the respective screws and disposed to be relatively rotated upon loosening of the bolts 133 which are threaded into the flange of one coupling half and which pass through arcuate slots in the flange of the other coupling half. By such relative rotation the carriages 30 may be accurately adjusted so that the tread stitchers 32 meet in the median transverse plane of drum D and so that the ply stitchers 31 operate at corresponding zones of the drum end portions and shoulders.

Figures 7, 8, 9:
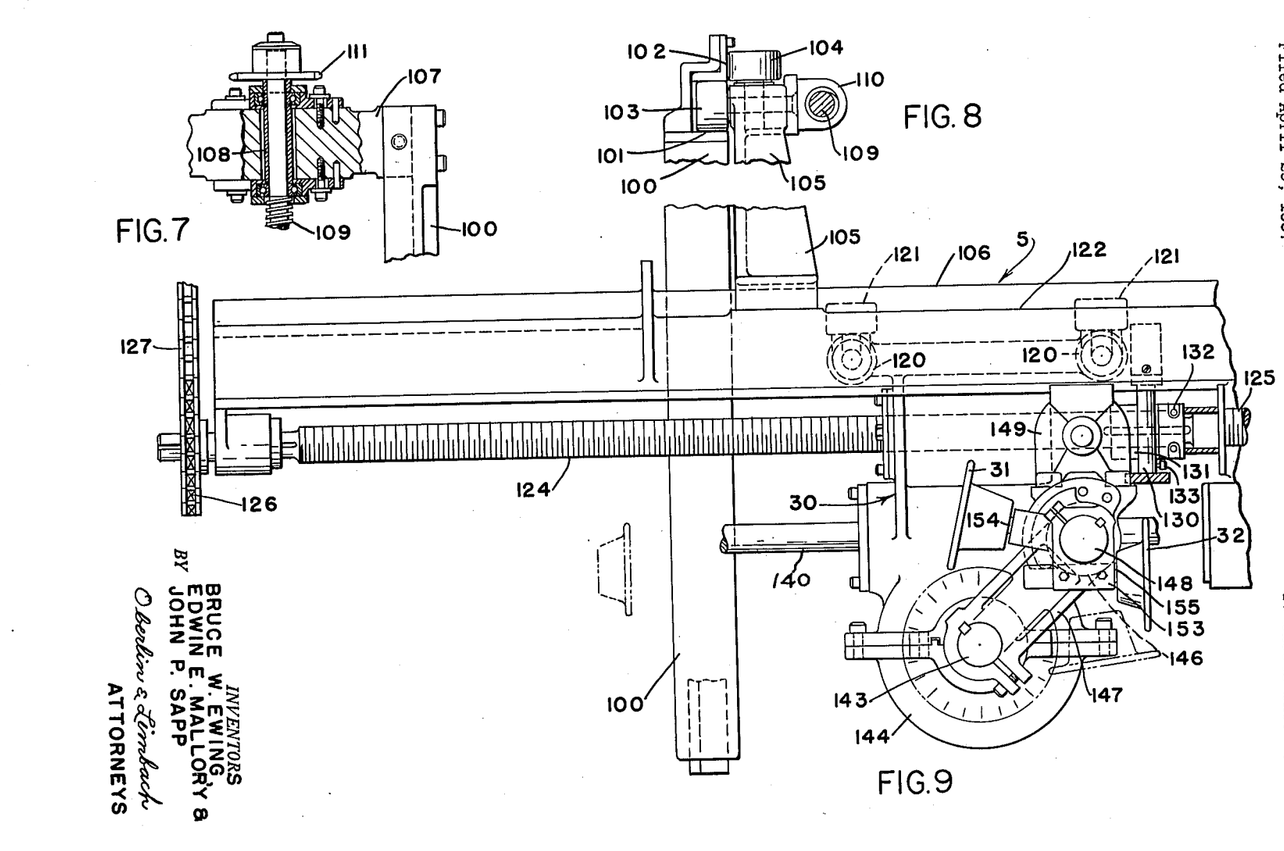
FIG. 7 is a cross-section view (line 7—7, FIG. 5) showing one of the screw shafts for effecting traverse of the stitcher assembly toward and away from the drum axis.
FIG. 8 is a cross-section view taken substantially along the line 8—8, FIG. 5 illustrating the screw-nut means for moving the stitcher assembly toward and away from the drum axis.
FIG. 9 and 9A are plan views, partly in cross-section or with parts broken away, as viewed from line 9—9, FIG. 5.

(3) and (4) *Rotary motions.*—Each carriage 30 is formed with a horizontal bore that is parallel to the screw shaft 124 bore through which a splined shaft 140 extends. Slidably keyed on shaft 140 is a worm 141, the latter being axially fixed and journalled in carriage 30. Said worm 141 meshes with worm wheel 142 keyed on a shaft 143 which is journalled in the carriage housing 144 about an axis which extends chordwise of the drum D and perpendicular to the inclined tracks 101.

Said worm 141 and shaft 140 are driven by reversible drive motor 145 through a chain drive 145A as best shown at the right-hand side of FIG. 9A. Thus, as worm 141 is turned, the shaft 143 is turned to turn therewith the tubular stitcher housing 146 that is mounted on an arm 147 keyed on said shaft 143.

Said stitcher housing 146 has journalled therein a stitcher carrier shaft 148 whose axis is parallel to the axis of shaft 143, said shaft 148 being rotated about its axis as by a fluid motor 149 on housing 146 through a chain drive, there being sprocket wheels 150 and 151 on the motor shaft 152 and shaft 148 respectively.

Figure 10:
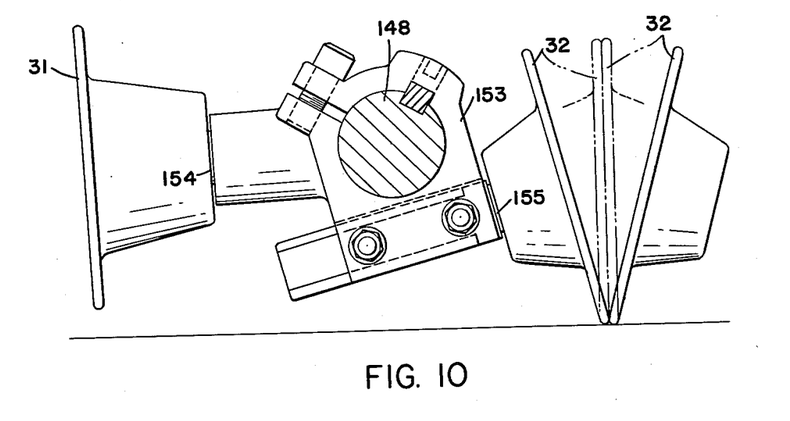
FIG. 10 is a view of the stitcher similar to FIG. 9 except on larger scale.
Figures 11, 12:
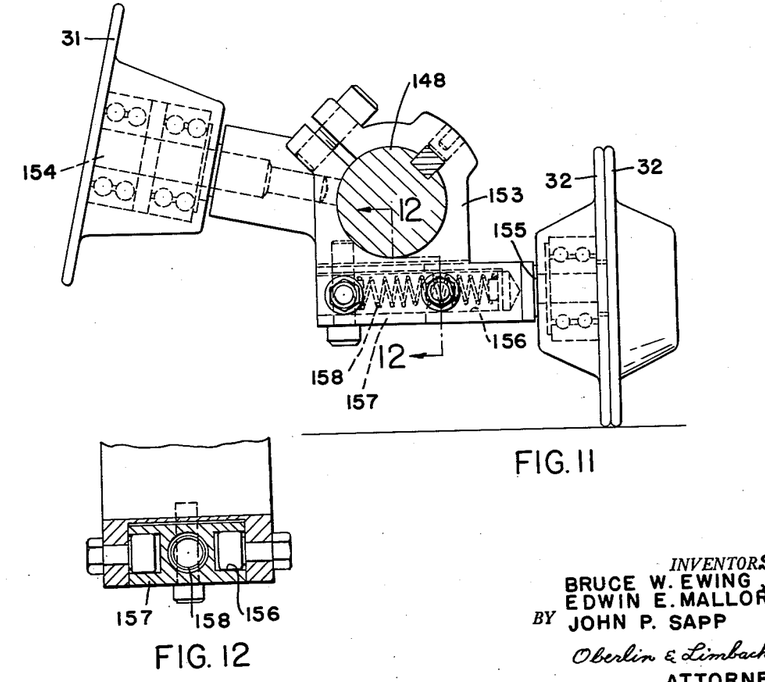
FIG. 11 is a view similar to FIG. 10 except showing the stitcher disc head in a different position.
FIG. 12 is a detail cross-section view taken substantially along the line 12—12, FIG. 11.

The upper end of each stitcher carrier shaft 148 has keyed thereto a stitcher head 153 to which the ply stitcher disc 31 and the tread stitcher disc 32 are journalled on shafts 154 and 155 about axes which are oblique relative to each other. The axis of disc 31 intersects and is perpendicular to the axis of shaft 148 and the axis of disc 32 is tangent to a circle having the axis of shaft 148 as a center.

The shaft 155 that mounts the tread stitcher disc 32 has a yieldable lost motion connection with said head 153 whereby the tread stitcher discs 32 may be brought together as shown in dotted lines in FIG. 10, and, as the carriages 30 are moved in a straight line parallel to the drum axis the tread stitcher discs will remain in engagement until the lost motion is taken up as shown in FIG. 11 whereby the tread stock will be stitched to the outer plies for a longer period of time at the middle where needed. Of course, the air motor 149 will at this time be actuated to tend to rotate the shaft 148 in a clockwise direction whereby the tread stitcher 32 at the left will be yieldably pressed against the tread and side wall stock as the shaft 148 moves toward the left. Similarly, the other shaft 148 which carries the right hand tread stitcher 32 will be rotated in a counterclockwise direction as said other shaft 148 is moved toward the right. The head 153 is formed with a slideway 156 for the complementary shaft portion 157 and a spring 158 is compressed between said parts.

Figures 5, 6:
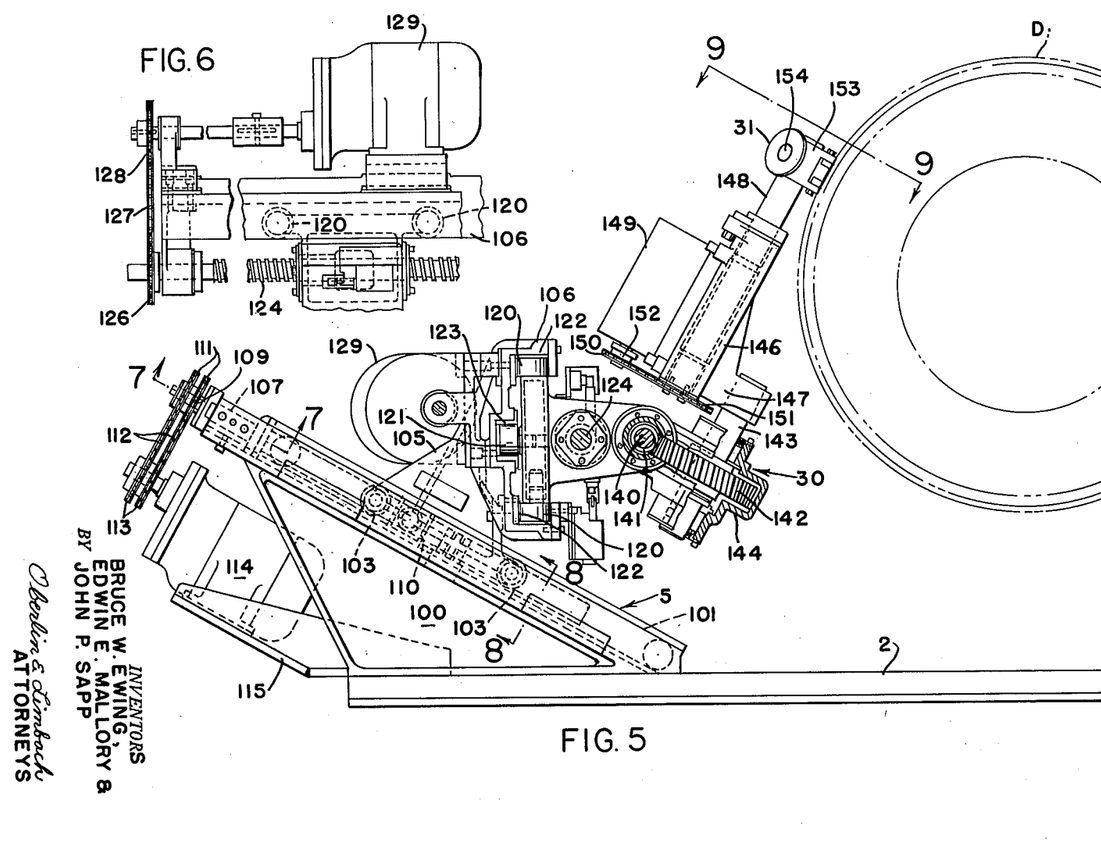
FIG. 5 is an end elevation view partly in cross-section and as viewed from the left-hand end of FIG. 2 showing the stitching assembly.
FIG. 6 is a fragmentary top plan view showing the drive motor for axial traverse of the stitcher heads or carriages.

From the foregoing description of the stitcher assembly it is apparent that the stitcher discs 31 and 32 of each carriage 30 are disposed to partake of several movements, namely (1) a radial traverse toward and away from the axis of the drum as effected by movement of the longitudinally extending carriage mount 106 along the downwardly inclined tracks 101; (2) an axial traverse parallel to the drum axis through the oppositely threaded screw shafts 124 and 125 which engage nuts in the carriages 30 that are guided along the longitudinally extending tracks 122 and 123 of the carriage mount 106; (3) a rotary motion about the axis of shaft 143 which extends chordwise of the drum or tangent to an arc struck from the axis of the drum and preferably passes through the axis of curvature of the drum shoulders; and (4) an oscillatory spring action for yieldably pressing either of the stitcher discs 31 or 32 radially toward the drum D, this being effected by the fluid motor 149 which turns the stitcher carrier shaft 148 which is parallel to shaft 143.

In addition to these movements, the stitcher discs 31 and 32 themselves are journalled on shafts 154 and 155 of the respective heads 153 so that as the drum D rotates the peripheries of the stitcher discs will apply pressure against ply or tread stock on the drum without sliding friction.

VI. AUTOMATIC CONTROL

The automatic control includes a judicious placement of limit switches and similar judicious placement of switch actuating cams on the elements whose movements it is desired to initiate, arrest, or control. In view of the extremely complicated nature of the automatic control system and the virtual impossibility in the various drawings, of showing each and every switch and its actuator, the same have for the most part been omitted. It is believed that persons skilled in the arts of electrical and fluid control may readily comprehend the required electrical circuits and fluid circuits and locations of the components without even schematic diagrams. Therefore, no attempt has been made herein to show any of the switches for controlling the several electric motors and for controlling the energization of solenoid valves and the like associated with the several fluid motors.

The operation and structure of the automatic control system will be fully evident from the ensuing description of the operation of the present machine under the heading "VII—Operation."

VII. OPERATION

*(Figs. 16 to 26)*

Assuming now that it is desired to use the present machine for building a ten ply truck or bus tire, for example, of a size 10.00 x 20 having dual beads, the following procedure may be followed. The present machine, by changing drums D may handle a large variety of different sizes of such heavy duty truck or bus tires ranging say, from 10.00 x 20 up to 14.00 x 24 and, of course, the principles of the invention are applicable whether the tires be of smaller or larger size than above indicated.

(1) With the outboard assembly 6 in withdrawn position and with the drum D in collapsed condition, beads B with their associated flipper strips are buttoned over the bead storage-placement rings 66 by the wells 72 and the beads B to be first applied against the ends of the drum D are positioned on the respective stepped shoulders 73.

(2) The outboard assembly 6 is moved forward and locked by actuation of lock cylinder 43.

Figure 16:
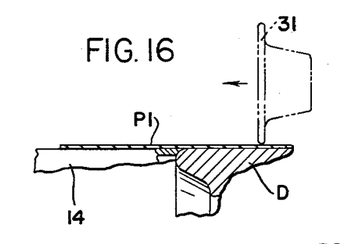

(3) The ply rings 14 are moved into engagement with the ends of the uncollapsed drum D as shown in FIG. 16 whereby said ply rings 14 serve to make the drum D substantially longer to provide support for first ply group P1 wrapped therearound. In the particular size of tire T mentioned above P1 comprises four plies successively wrapped around said drum D and said ply rings 14.

(4) If desired, these plies P1 may be stitched together by movement of the stitcher discs 31 as shown in FIG. 16. For this operation, while drum D is rotated by motor 11, the radial traverse motor 114 is deenergized, the axial traverse motor 129 is moving the carriages 30 horizontally, and the motors 149 cause the stitchers 31 to apply a stitching force.

(5) The ply rings 14 are then axially withdrawn by motors 12 leaving the plies P1 in overhanging relation to the shoulders of the drum D.

Figure 17:
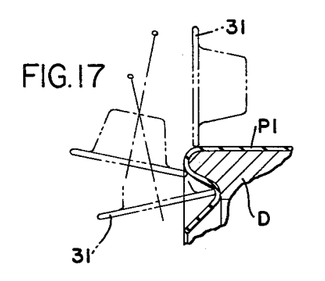

(6) The overhanging ends of the plies P1 are now turned over the respective shoulders of the drum D by progressive movement of the stitcher discs 31 approximately as shown in FIG. 17. The inner portion of the plies P1 will be disposed somewhat as shown in FIG. 17 and will be somewhat ruffled or pleated. For this operation, the drum D rotates at intermediate speed, the axial traverse motor 129 moves carriages 30 near the ends of the drum D, the radial traverse motor 114 moves the carriages 30 in so that the axes of the stitchers 31 are approximately parallel to the drum axis and so that the axes of shafts 143 pass approximately through the axes of curvature of the drum shoulders, the motors 149 press the ply stitchers 31 against the plies P1, and the motor 145 rotates the stitchers 31 around the shoulders while pressed against the overhanging plies. Thereafter, motor 114 may be energized to shift the stitchers 31 inwardly to work at the concave portions of the drum shoulders. Finally, the axial traverse and radial traverse motors 129 and 114 are successively energized to shift the stitchers 31 axially away from the drum ends and radially outward of the drum periphery.

Figure 18:
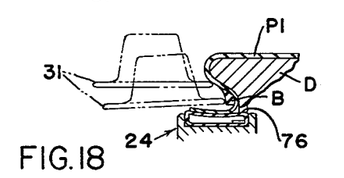

(7) The beads B on the stepped shoulders 73 are now pressed against the inturned plies P1 as shown in FIG. 18 by movement of the bead placement and storage rings 66 toward the drum shoulders. Then the bag assemblies 24 are withdrawn axially to positions inside the drum shoulders while the ply stitchers 31 are pressed against the beads B as shown in FIG. 18.

Figure 19:
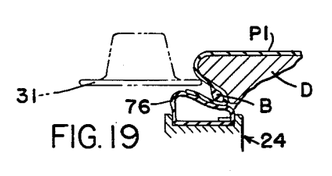

(8) The stitchers 31 are moved radially out of the way while the air bags 76 are inflated to flare out the plies P1 partly around the beads B as shown in FIG. 19.

Figure 20:
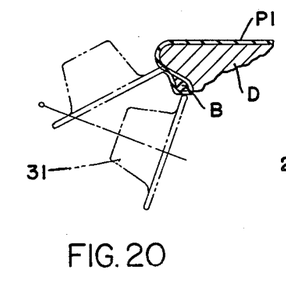

(9) Air bags 76 are then deflated and moved axially inside the drum D, whereupon by manipulation of the ply stitchers 31 as shown in FIG. 20 turns out the plies P1 against the beads B.

(10) Four more plies P2 are then applied around the drum D and turned in by movements of the stitcher discs as previously described and as shown in FIG. 17.

(11) The second bead B is then taken from the placement-storage ring 66 and placed on the shoulder 73, whereupon the latter is stuck against the now turned in second four plies P2.

(12) The air bags 76 are again moved out and inflated to displace the inner portions of the plies P2 in a manner shown in FIGS. 18 and 19.

Figure 21:
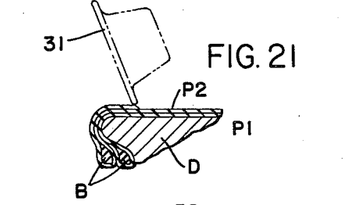

(13) The stitcher discs 31 again are moved around the drum shoulders as shown in FIG. 21 and across the periphery of the drum D to stitch the ply lock (the extra length of plies P2).

Figure 22:
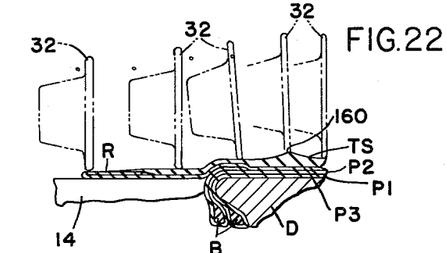

(14) The final two plies P3 are applied to the drum D and on ply rings 14 as shown in FIG. 22.

(15) The rim chafing strip R which comprises a woven fabric is then applied also as shown in FIG. 22.

(16) The tread and side wall stock TS is now applied on the drum D and is stitched by the tread stitcher discs 32 which start at the center line of the drum D and which move apart as shown in FIG. 22, the pressure of the stitcher discs being varied as the movement progresses, preferably reduced at the high spots 160.

Figures 23, 24:
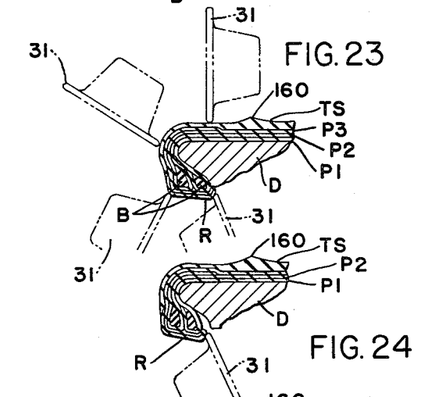

(17) The overhanging stock is then turned down by moving the ply stitcher discs 31 as shown in FIG. 23, the rim chafing strip R being tucked in between the first bead B and the drum shoulder.

(18) The ply stitcher discs 31 are now employed as in FIG. 24 to pull the ends of the tire carcass T from the drum shoulders.

Figure 25:
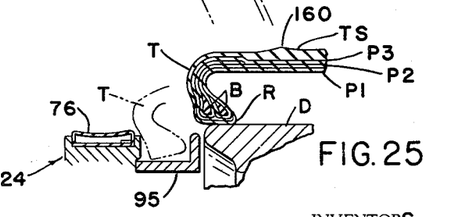

(19) The air bag units 24 including air bags 76 are now pulled completely out of drum D with the hook 95 of the outboard air bag unit 24 disposed axially adjacent the drum D so that the latter may be collapsed and pulled inwardly relative to the carcass T as shown in FIG. 25.

(20) The carcass T is now shoved axially so that the bead thereof drops down into said hook or holder 95 as shown in dotted lines in FIG. 25.

(21) The lock cylinder 43 is actuated to unlock the outboard assembly 6 and the cylinder 35 is actuated to cause retraction of the outboard assembly 6 along the base 3 whereby the carcass T is dragged off the collapsed drum D and in a position to be raised by the conveyor 96 for transport away from the tire building machine as the outboard assembly continues to move. With the drum D in collapsed condition and with the outboard assembly 6 retracted, beads B may now be placed on the respective bead placement-storage rings 66.

(22) Finally, the outboard assembly 6 is moved forward by reverse actuation of the cylinder 35 and when the outboard assembly 6 reaches its forward position the lock cylinder 43 is actuated to lock said outboard assembly in the forward operating position and the brake 51 is released so that driving force through the drum drive shaft 7 uncollapses the drum D preparatory to repeating the foregoing operations to build the next tire carcass T.

Referring again to FIGS. 16 to 26, it can be seen that the ply stitcher discs 31 may at any given time partake of several motions so as to best perform the different operations, and in all positions the ply stitcher discs 31 or tread stitcher discs 32 are yieldably pressed with desired pressure against the ply or tread stock as the case may be. Of course, after the ply stitchers 31 have moved around the convexly curved ends of the drum D, they may be given an opposite turning movement accompanied by radial inward movement and then by axial movement and radial outward movement. These various movements of stitchers 31 and 32 and their actuators may be coordinated as desired and as aforesaid the specific cams and switches have not been herein illustrated, since once knowing what the desired movements are, the arcuate, radial, and axial movements may be combined in any desired way to produce the ultimate desired movement.

Other modes of applying the principle of the invention may be employed, change being made as regards the details described, provided the features stated in any of the following claims, or the equivalent of such, be employed.

We therefore particularly point out and distinctly claim as our invention:

1. For use with a tire building machine having a rotary drum around which stock is adapted to be wrapped and over the ends of which the stock is adapted to be turned in for positioning of beads thereagainst, a stitcher assembly comprising a pair of stitcher carriages, a pair of stitcher discs on each carriage adapted to be selectively moved to press stock against the drum and drum ends, means for supporting said carriages for movement parallel to the axis of the drum, means supporting said carriages for movement radially of the drum along a path that is downwardly inclined with respect to the drum, and means mounting said stitcher discs on said carriages for oscillation about an axis that is tangent to an arc struck from the axis of the drum.

2. The stitcher assembly of claim 1 wherein coaxial, juxtaposed, and oppositely threaded screws are provided for moving said carirages axially of the drum toward and away from each other, and wherein a coupling at the juxtaposed ends of said screws holds the latter against relative rotation, said coupling being releasable for relative rotation of one screw with respect to the other to predeterminedly axially adjust said carriages with respect to the drum.

3. The stitcher assembly of claim 1 wherein one disc of each carriage has a lost motion spring connection means with the respective carriage operative to provide for increased stitching time as the carriages move axially apart after having been moved to engage and to take up the lost motions of said discs.

4. A stitcher carriage for a tire building machine having a rotary tire building drum comprising a carriage housing, a shaft projecting from said housing, means operative to oscillate said shaft, an oscillatory stitcher head carried by said shaft, a ply and tread stitcher disc on said head disposed on opposite sides of the axis of oscillation of said head and arranged so that the peripheries of said discs may be selectively engaged with stock wrapped around the drum upon oscillation of said head.

5. The stitcher carriage of claim 4 wherein said tread stitcher disc has an axial lost motion connection means with said head operative to provide increased stitching time along a certain portion of the stock engaged thereby when said carriage is moved axially of the drum.

6. In a tire building machine the combination of a collapsible rotary drum on which tire building stock is adapted to be wrapped; expansible means for folding out stock at the ends of said drum to encase tire beads therein, said means having attached thereto a tire removing hook adapted to engage a bead of the tire; means for collapsing said drum, and means for axially reciprocating said expansible means and thus said hook to drag said tire axially from the collapsed drum.

7. A stitcher carriage for a tire building machine having a rotary drum comprising a carriage adapted to be moved axially and radially with respect to said drum, a stitcher head journalled in said carriage for movements in an orbital path about a first axis that is tangent to an arc struck from the center of said drum and for oscillation about a second axis that is parallel to said first axis, a pair of rotary stitcher discs mounted on said head on opposite sides of said second axis, the periphery of either disc engaging stock wrapped around the drum upon oscillation of said head about said second axis, and the disc engaging the stock being positioned with its periphery lying in a plane generally transverse to the stock engaged thereby when said head is orbitally moved about said first axis and around the drum ends.

References Cited in the file of this patent

UNITED STATES PATENTS

| | | |
|---|---|---|
| 1,766,727 | Steele | June 24, 1930 |
| 1,838,057 | Jenkinson | Dec. 22, 1931 |
| 1,919,384 | Slusher | July 25, 1933 |
| 2,251,904 | Breth et al. | Aug. 12, 1941 |
| 2,313,035 | Breth | Mar. 9, 1943 |
| 2,381,379 | Stevens | Aug. 7, 1945 |
| 2,445,728 | Stevens | July 20, 1948 |
| 2,605,197 | Stevens | July 29, 1952 |
| 2,608,497 | Breth | Aug. 26, 1952 |
| 2,614,952 | Kraft | Oct. 21, 1952 |
| 2,642,921 | Appleby | June 23, 1953 |
| 2,649,892 | Appleby | Aug. 25, 1953 |
| 2,681,684 | Giletta et al. | June 22, 1954 |
| 2,699,198 | Balhizer | Jan. 11, 1955 |
| 2,715,931 | Frazier | Aug. 23, 1955 |
| 2,715,933 | Frazier | Aug. 23, 1955 |
| 2,754,884 | Jeffreys et al. | July 17, 1956 |
| 2,838,092 | McMahon | June 10, 1958 |